(12) United States Patent
Mizuta

(10) Patent No.: US 7,014,002 B2
(45) Date of Patent: Mar. 21, 2006

(54) BATTERY HOLDING STRUCTURE FOR VEHICLE

(75) Inventor: Fumio Mizuta, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 204 days.

(21) Appl. No.: 10/683,702

(22) Filed: Oct. 14, 2003

(65) Prior Publication Data

US 2004/0079570 A1   Apr. 29, 2004

(30) Foreign Application Priority Data

Oct. 16, 2002   (JP) .............................. 2002-302156

(51) Int. Cl.
*B60R 16/04* (2006.01)

(52) U.S. Cl. ...................... 180/68.5; 248/503; 248/505

(58) Field of Classification Search ..................... None
See application file for complete search history.

(56) References Cited

U.S. PATENT DOCUMENTS

| | | | | |
|---|---|---|---|---|
| 2,551,990 A | * | 5/1951 | Wills ............................ 429/96 |
| 2,870,855 A | * | 1/1959 | Hildreth ...................... 180/68.5 |
| 3,248,268 A | * | 4/1966 | Kohler ......................... 429/96 |
| 3,752,254 A | * | 8/1973 | Carley et al. ............... 180/68.5 |
| 3,826,115 A | * | 7/1974 | Davis ........................... 70/258 |
| 4,535,863 A | * | 8/1985 | Becker ....................... 180/68.5 |
| 4,565,256 A | * | 1/1986 | Valdez ........................ 180/68.5 |
| 4,754,827 A | * | 7/1988 | Hirabayashi ............... 180/68.5 |
| 5,222,711 A | * | 6/1993 | Bell ............................. 248/503 |
| 6,386,528 B1 | * | 5/2002 | Thorn et al. ................. 267/201 |

FOREIGN PATENT DOCUMENTS

| GB | 2015951 A | * | 9/1979 |
|---|---|---|---|
| JP | Y2 63-47191 | | 12/1988 |
| JP | A 11-342809 | | 12/1999 |

* cited by examiner

*Primary Examiner*—Christopher P. Ellis
*Assistant Examiner*—Christopher Bottorff
(74) *Attorney, Agent, or Firm*—Oliff & Berridge, PLC

(57) ABSTRACT

Since the battery is placed in the battery tray, the battery can stably held in place even if the battery support part of the floor panel is somewhat uneven. The battery support part (31) on which the battery (B) is supported is a part of a floor panel (30) of the vehicle (21), the number of the mounting holes (31) is at least two, the battery is placed in a battery tray (5) placed on the battery support part, the battery tray has lugs (5*a*) provided with holes (5*b*) having a diameter greater than that of the hook rods (1) and smaller than an outside diameter of the tubular spacers (3) at positions corresponding to the mounting holes, and the battery tray (5) is fastened together with the battery (B) to the battery support part (31) of the floor panel through the tubular spacers by the hook rods.

4 Claims, 5 Drawing Sheets

BATTERY HOLDING STRUCTURE FOR VEHICLE

BACKGROUND OF THE INVENTION

1. Field of the Invention

The present invention relates to a battery holding structure for holding a battery on a vehicle and, more particularly, to a battery holding structure suitable for holding a battery on a utility vehicle.

2. Description of the Related Art

Utility vehicles are those suitable for various kinds of work including carrying goods on rough roads. Generally, a utility vehicle 21 as shown in FIG. 1 has a body frame 26 formed by assembling metal parts, four wheels, namely, two front wheels 22 and two rear wheels 23, a power unit, not shown, such as an engine, a driver's seat 24, and a load carrying platform 25 disposed behind the driver's seat 24. In most cases, the wheels 22 and 23 are provided with wide tires suitable for running on rough roads.

In most cases, a battery mounted on the utility vehicle 21 is used not only as a power source for starting, ignition and control of the engine, illumination and lighting marker lamps of the vehicle, but also as a power source for driving drive motors for driving working equipment. Therefore, a plurality of fully charged batteries are stored and the battery on the working vehicle 21 is replaced frequently with a fully charged one. Therefore the battery is held in a place that facilitates changing the battery, such as on a floor panel under or near the driver's seat 24.

A conventional battery holding structure for holding a battery on a vehicle body will be described by way of example with reference to FIG. 5. A battery tray 50 is placed on a floor panel 30 of the body of a working vehicle, not shown. The battery tray 50 has a bottom wall 50a, and low side walls 50b and 50c standing from the bottom wall 50a. A battery B is mounted on the battery tray 50. Positioning lugs 52 provided with holes 52 project outward from substantially middle parts of the upper edges of the front and the rear sidewall 50c, respectively. Mounting holes 31 are formed in the floor panel 30 at positions respectively corresponding to the holes 52a of the positioning lugs 52.

A clamping plate 7 is placed longitudinally across a middle part of the upper surface of the battery B. Holes 7b are formed in opposite end parts of the clamping plate 7 so as to correspond to the holes 52a of the lugs 52, respectively. Hook rods 1 having threaded upper parts 1a are passed upward from below the floor panel 30 through the two mounting holes 31, the two holes 52a and the two holes 7b of the clamping plate 7 so that the threaded upper parts 1a project upward from the clamping plate 7. Nuts 2 are screwed on the threaded upper parts 1a to hold the battery B on the floor panel 30. Each of the hook rods 1 has an L-shaped lower part 1b. The L-shaped lower parts 1b engages with the edges of the mounting holes 31 of the floor panel 30 to hold the hook rods 1 in engagement with the floor panel 30.

In a battery holding structure proposed in JP11-342809A (Paragraph No. 0020, FIGS. 2 and 5) a cover plate of a hanger is placed on the upper front edge of a battery, a bent part of a round rod welded to the cover plate is engaged in a hole formed in an upper connecting plate, bent parts of hanger bolts (hook rods) are engaged in holes formed in a lower connecting plate, and nuts are screwed on threaded parts of the hanger bolts projecting from a bolt hole to hold the battery.

In a battery holding structure proposed in JP63-47191U (Middle part of the right column in p. 2, FIG. 5), a pair of swing arms supported for turning in vertical planes in a rear part of a vehicle body are connected by a connecting plate, a battery is mounted on a tray supported on the connecting plate, and a holder is placed on a rubber pad placed on the battery, and the holder is fastened with nuts to stays (hook rods) connected by brackets to the connecting plate.

Each of the foregoing conventional battery holding structure and the prior art battery holding structures holds the battery by connecting the clamping member (clamping plate or the like) placed on the upper surface of the battery, and the battery support part (floor of the vehicle or the like) with the hook rods having the L-shaped lower parts and the threaded upper parts.

The battery of the utility vehicle in FIG. 5 is held on the floor panel under the driver's seat by such a battery holding structure. The battery holding structure needs at least the two hook rods, the two hook rods need to be passed upward from below the floor panel through the holes formed in the floor panel, and the nuts are screwed on the threaded upper parts of the hook rods passed through the holes of the clamping plate disposed on the upper surface of the battery and projecting upward from the holes of the clamping plate to hold the battery firmly on the floor panel. The hook rod passed upward through the hole of the floor panel must be supported by hand until the nut is screwed on the threaded upper part so that the hook rod may not drop. Therefore, the mechanic needs to perform a troublesome work for supporting the hook rod by one of the hands and placing the clamping plate on the battery by the other hand. The floor panel of the working vehicle, in particular, is at a low height from the ground and hence the mechanic unavoidably needs to stoop during most part of the troublesome work, which puts a considerable workload on the mechanic.

The battery may be damaged if the nuts are tightened excessively and the battery may unstably held and rattle if the nuts are tightened insufficiently. Therefore, the nuts must be tightened properly.

SUMMARY OF THE INVENTION

Accordingly, it is an object of the present invention to provide a battery holding structure for a vehicle, facilitating work for holding a battery on the vehicle, and capable of fastening a battery to the vehicle in a short time and of firmly holding a battery on the vehicle.

According to the present invention, a battery holding structure for holding a battery at a predetermined position on a vehicle, comprising: a floor panel having a battery support part for supporting a battery thereon, of a vehicle, provided with mounting holes; a clamping member provided with holes in its opposite end parts and placed on top of the battery;

hook rods each having a substantially J- or L-shaped lower part and a threaded upper part, passed from below the battery support part upward through the mounting holes of the battery support part such that the lower parts are engaged with the edges of the mounting holes of the battery support part and the threaded upper parts project upward through the holes of the battery clamping member; nuts screwed on the threaded upper parts of the hook rods to hold the battery on the battery support part; tubular spacers having an outside diameter greater than diameters of the mounting holes and a length defining distance between the clamping plate and the battery support part, and being put on the hook rods, respectively; and hook rod holding means placed inside the tubular spacers to hold the hooked rods in the tubular spacers, respectively.

When the hook rods are passed upward through the mounting holes, and the tubular spacers are put on the hook rods via the upper ends of the hook rods, the hook rod holding means hold the hook rods in the tubular spacers. Since the lower ends of the tubular spacers rest on the upper surface of the battery support part, the hook rods and the tubular spacers will not fall down even if the hook rods are not supported by hand. Thus, the battery holding structure facilitates battery mounting work. The hook rod holding means may be any suitable means capable of exerting resistance against the axial movement of the hook rods relative to the tubular spacers and permitting the axial movement of the hook rods relative to the tubular spacers, such as O rings, metal C rings, rubber rings or a high-viscosity grease.

Since the distance between the upper surface of the battery support part and the lower surface of the clamping member is determined by the tubular spacers extending between the upper surfaces of the edges of the mounting holes of the battery support part and the lower surfaces of the edges of the holes of the clamping member, and the nuts are screwed on the threaded upper end parts of the hook rods to fasten the battery to the battery support part. Thus, the excessive tightening of the nuts is prevented by the tubular spacers.

The battery holding structure prevents the hook rods from falling off the tubular spacers by the simple hook rod holding means. Thus, the battery holding structure is inexpensive and reliable.

Preferably, the hook rod holding means are O rings.

The O rings are able to exert a proper resistance against the movement of the hook rods relative to the tubular spacers.

Preferably, the battery support part on which the battery is supported is a part of a floor panel, such as a floor panel under a driver's seat, of the vehicle, the number of the mounting holes is at least two, the battery is placed in a battery tray placed on the battery support part, the battery tray has lugs provided with holes having a diameter greater than that of the hook rods and smaller than the outside diameter of the tubular spacers at positions corresponding to the mounting holes, and the battery tray is fastened together with the battery to the battery support part of the floor panel through the tubular spacers by the hook rods.

Thus, the battery and the battery tray are held firmly on the battery support part of the floor panel, for example, under the driver's seat of the work vehicle through the tubular spacers by the hook rods. Since the battery is placed in the battery tray, the battery can stably held in place even if the battery support part of the floor panel is somewhat uneven.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
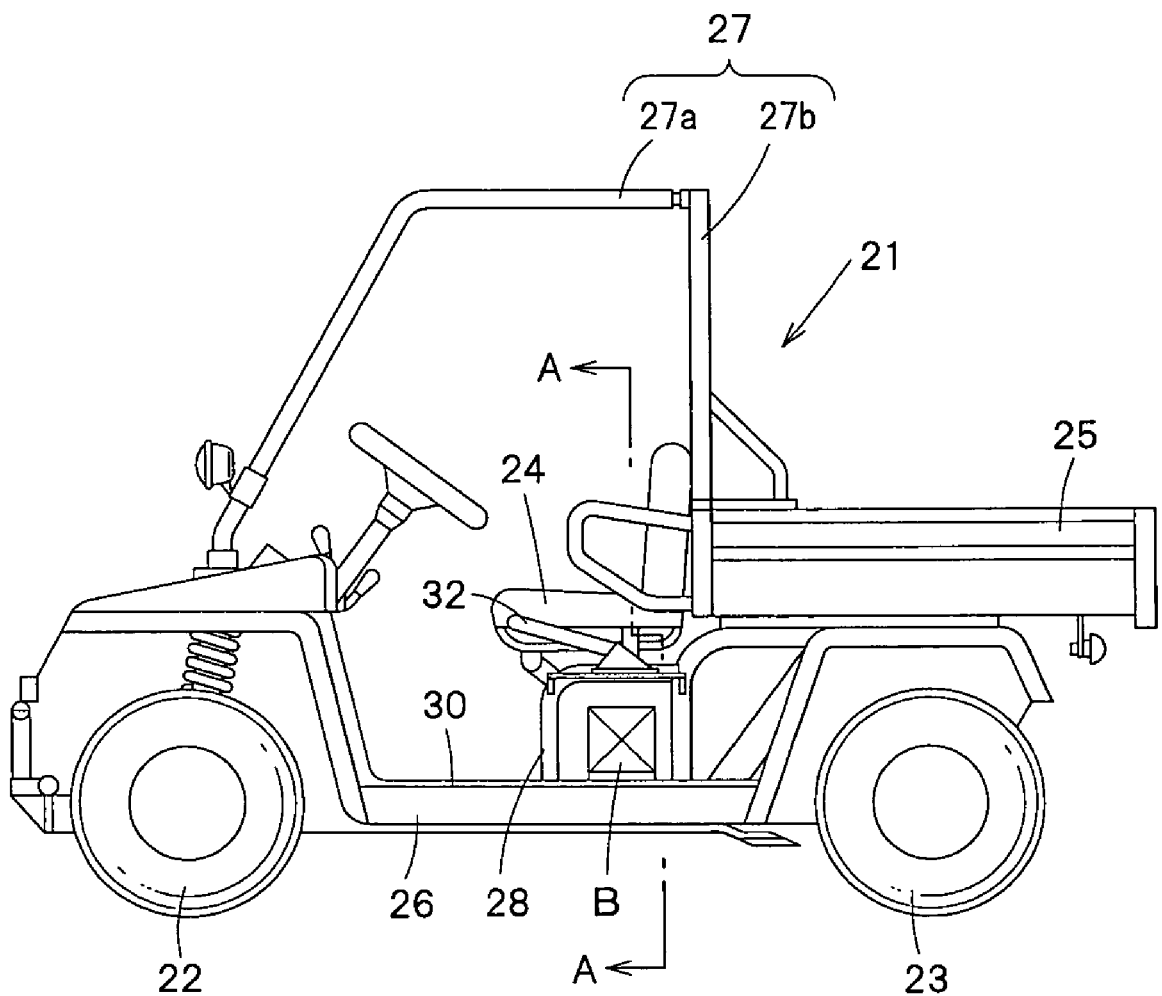
FIG. 1 is a side elevation of a utility vehicle provided with a battery holding structure in a preferred embodiment according to the present invention.
Figure 2:
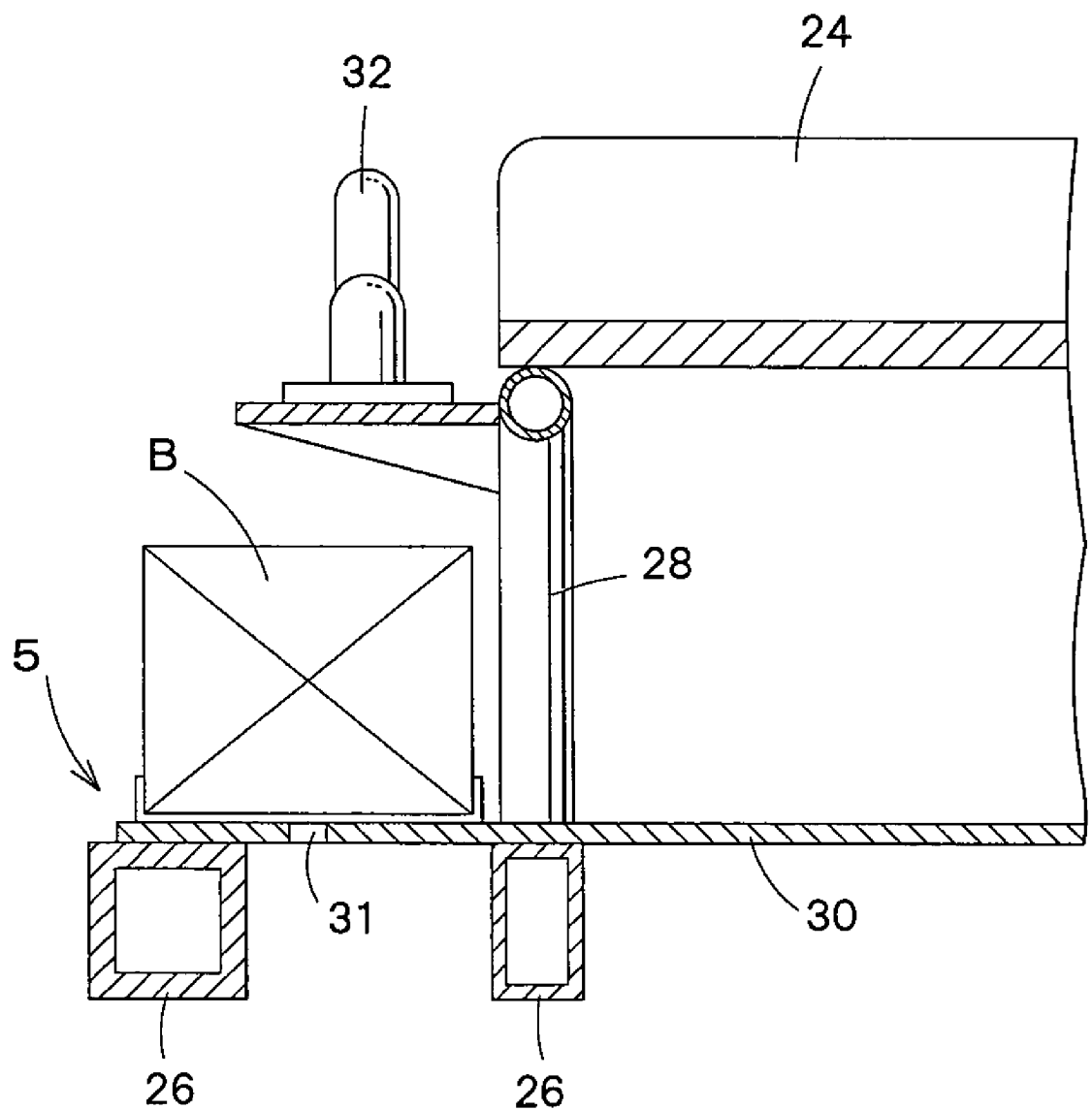
FIG. 2 is an enlarged sectional view taken on the line A—A in FIG. 1.
Figure 3:
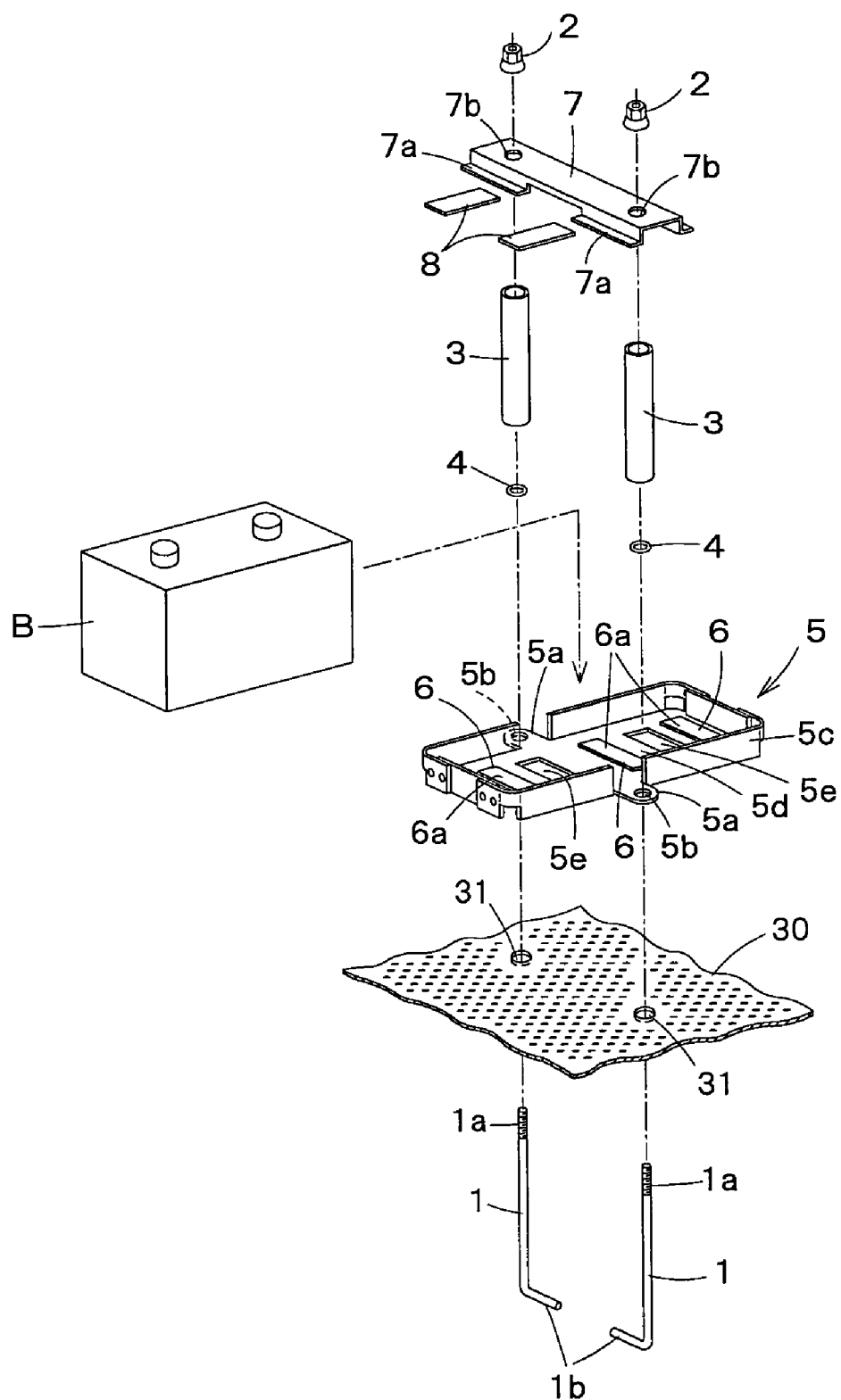
FIG. 3 is an exploded perspective view of the battery holding structure embodying the present invention.
Figure 4:
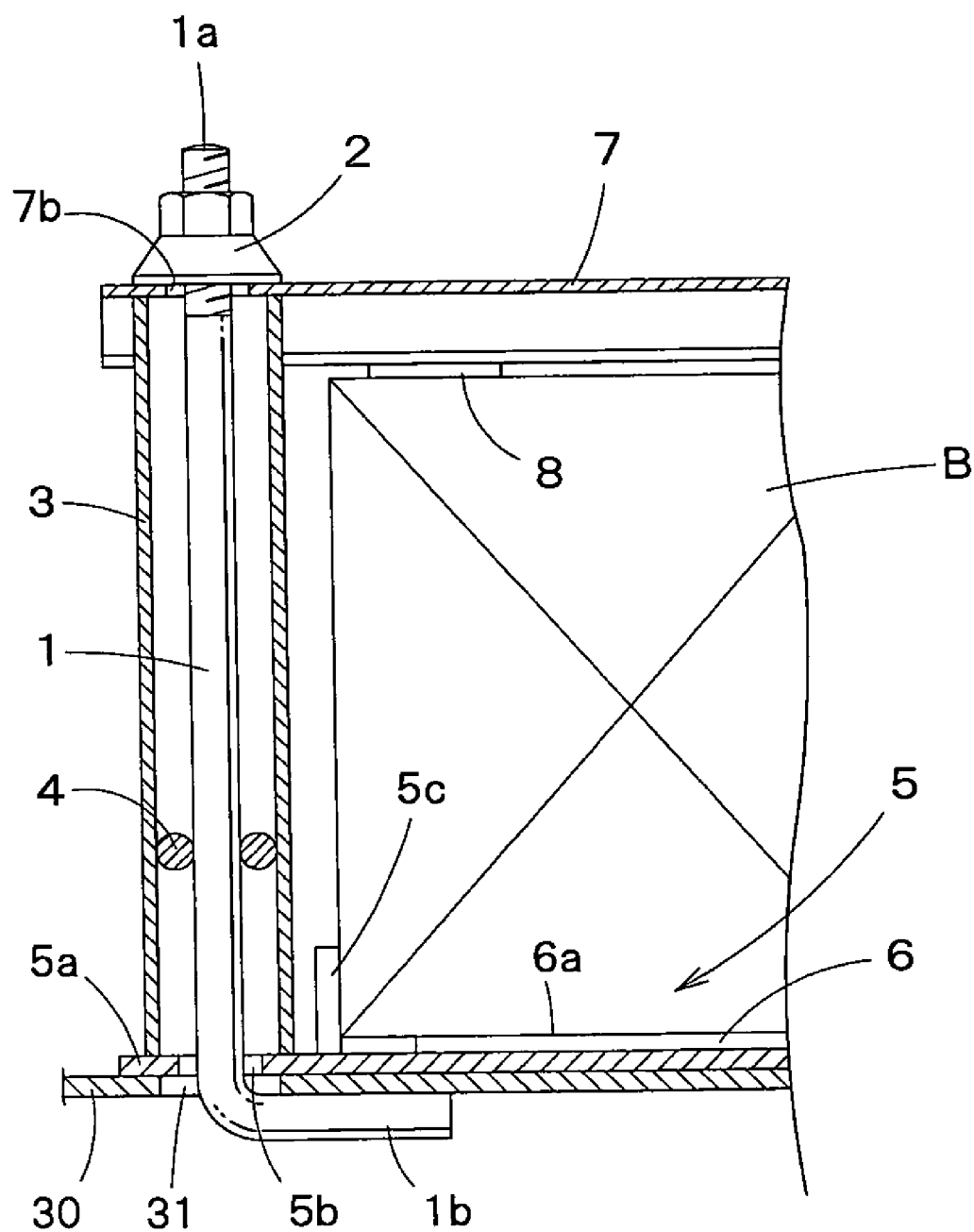
FIG. 4 is a fragmentary, longitudinal sectional view of the battery holding structure shown in FIG. 3 holding a battery on a vehicle.
Figure 5:
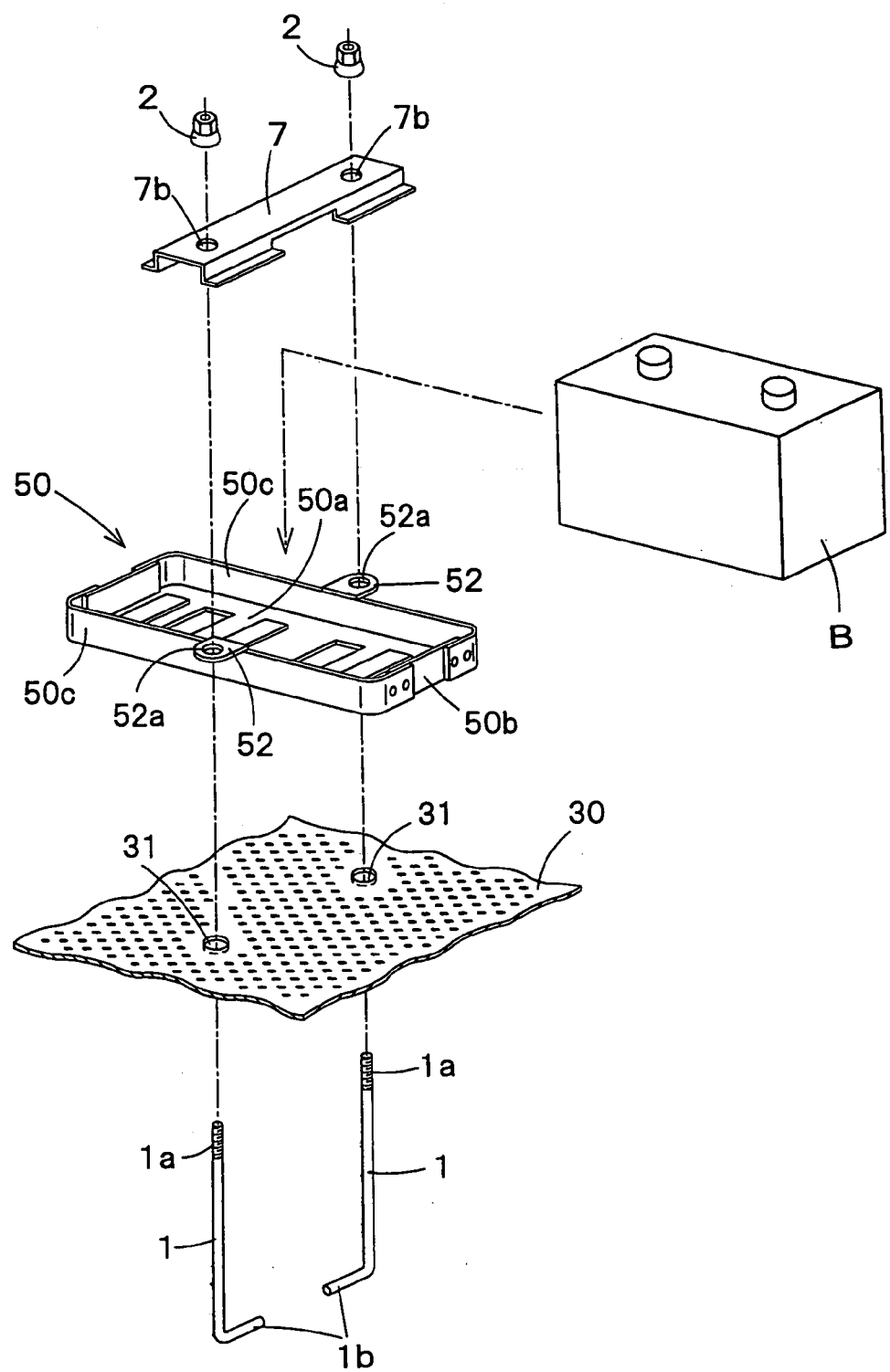
FIG. 5 is a perspective view of a conventional battery holding structure.

FIG. 1 is a side elevation of a utility vehicle provided with a battery holding structure in a preferred embodiment according to the present invention, FIG. 2 is a sectional view taken on the line A—A in FIG. 1, FIG. 3 is an exploded perspective view of the battery holding structure embodying the present invention and FIG. 4 is a fragmentary, longitudinal sectional view of the battery holding structure shown in FIG. 3 holding a battery on a vehicle. Referring to FIG. 1, a utility vehicle 21 has a body frame 26 formed by assembling metal members, four wheels, namely, two front wheels 22 and two rear wheels 23, a driver's seat 24, a cabin frame 27, and a load carrying platform 25. More specifically, the front wheels 22 are suspended from a front part of the body frame 26, the rear wheels 23 are suspended from a rear part of the body frame 26, the driver's seat 24 is disposed behind the front wheels 22, and the load carrying platform is disposed behind the driver's seat 24 . . . The load carrying platform 25 extends backward over the rear wheels 23 from a position near the driver's seat 24. The cabin from 27 extends from a front part of the body frame 26 to a part of the body frame 26 between the driver's seat 24 and the load carrying platform 25 so as to cover the driver's seat 24. A power unit, such as an engine, not shown, is placed in a space under the load carrying platform 25. The power unit drives the rear wheels 23 or both the front wheels 22 and the rear wheels 23 to move the working vehicle 21. The wheels 22 and 23 are provided with wide tires suitable for running on rough roads. The cabin frame 27 is formed by bending and welding round steel pipes. The cabin frame 27 is built by joining together a front frame 27a and a rear frame 27b which are formed separately.

The driver's seat 24 is mounted on a seat stand 28 formed by bending and welding steel pipes. The seat stand 28 is fixed to the body frame 26. A flat floor panel 30 is extended under the driver's seat 24. A battery tray 5 is placed on a battery support part, on one side of the utility vehicle 21, of the floor panel 30 to hold a battery B thereon as shown in FIG. 2. The position of the battery support part is selectively determined such that the battery B held on the battery support part can easily be observed, work for replacing the battery B with another battery is not interfered with frames, devices and such, and the battery B can easily removed from and placed on the floor panel 30.

Referring to FIG. 3, the battery tray 5 is a substantially rectangular shallow pan and has a bottom wall 5d and a frame 5c framing the bottom wall 5d. Corresponding middle parts of the opposite long sides of the frame 5c are cut and bent outward to form lugs 5a projecting outward from the bottom wall 5d. The lugs 5a are provided with holes 5b, respectively. Slots 5e are formed at intervals in the bottom wall 5d, and rubber pads 6 are applied to parts, between the slots 53, of the bottom wall 5d. A clamping plate 7 is placed on top of the battery B. Side walls of each of the opposite end parts of the clamping plate 7 are bent to form two L-shaped flanges 7a. Holes 7b are formed in the opposite end parts of the clamping plate 7 so as to be aligned with the holes 5b of the lugs 5a.

Two mounting holes 31 are formed through predetermined parts of the floor panel 30. The battery tray 5 is placed on the floor panel 30 so that the holes 5b of the lugs 5a of the battery tray 5 are aligned with the mounting holes 31, respectively. In FIGS. 1 and 2, a reference numeral 32 denotes a parking brake lever.

There is no substantial difference between the battery holding structure of the present embodiment and the conventional battery holding structure in respect of the foregoing matters. Members associated with hook rods and the arrangement of those members according to the present embodiment are different from those of the conventional battery holding structure.

Referring to FIG. 3, each of hook rods 1 included in the battery holding structure of the present embodiment, similarly to the hook rods of the conventional battery holding structure, has an L-shaped (or J-shaped) lower part 1b and a threaded upper part 1a. Means used by the present embodiment for fastening the battery B and the battery tray 5 to the floor panel 30 is different from that used by the conventional battery holding structure. In the embodiment, the battery holding structures have a tubular spacer 3 to define a distance between the lug 5a of the battery tray 5 and the clamping plate 7, and an O ring (hook rod holding means) 4 provided between an inside hole of the tubular spacer 3 and an outer periphery of the hook rod. Each hook rod 1 is passed through the tubular spacer 3, and the O ring (hook rod holding means) 4 is put on the hook rod 1 so as to lie between the hook rod 1 and the tubular spacer 3 to exert resistance against the axial movement of the hook rod 1 relative to the tubular spacer 3. The tubular spacers 3 have a length corresponding to the distance between the clamping plate 7 and a plane including the upper surfaces 6a of the rubber pads 6, which corresponds to the height of the battery B placed on the battery tray 5. The tubular spacers 3 have an inside diameter greater than the diameter of the hook rods 1, and an outside diameter greater than the diameters of the holes 7b of the clamping plate 7 and the holes 5b of the lugs 5a. If the battery b is mounted directly on the floor panel 30 without using the battery tray 5, the tubular spacers 3 are formed in an outside diameter greater than the diameter of the mounting holes 31 of the floor panel 30 so that the tubular spacers 3 may not fall down through the mounting holes 31. Since the O ring 4 is elastically deformable, the O ring r is formed in an outside diameter slightly greater than the inside diameter of the tubular space 3 so that the O ring 4 may be compressed in the tubular spacer 3 to exert proper resistance against the movement of the hook rod 1 relative to the tubular spacer 3.

Referring to FIG. 4, the battery tray 5 is disposed at a predetermined position on the floor panel 30, and the battery B is placed on the battery tray 5. Then, the hook rods 1 are passed from below the floor panel 30 through the mounting holes 31 and the holes 5b of the lugs 5a of the battery tray 5. Then, the O rings 4 are put on the two hook rods 1 and placed at predetermined positions on the hook rods 1. Then, the tubular spacers 3 are put from above the hook rods 1 on the hook rods 1. The O rings 4 holds the hook rods 1 in the tubular spacers 3 to restrain the hook rods 1 from falling down through the holes 5b of the lugs 5a and the mounting holes 31.

Subsequently, rubber pads 8 are put on top of the battery B, and the clamping plate 7 is put on the rubber pads 8 so that the threaded upper parts 1a of the hook rods 1 project upward through the holes 7b. Then, the nuts 2 are screwed on the threaded upper parts 1a of the hook rods 1 to fasten the battery B together with the battery tray 5 to the floor panel 30. Since the tubular spacers 3 are extended between the lugs 5a of the battery tray 5 and the clamping plate 7, the battery B can be fastened to the battery tray 5 by an optimum fastening force by sufficiently tightening the nuts 2 and hence the nuts 2 will not loosen. Since the tubular spacers 3 press the battery tray 5 firmly against the floor panel 30 when the nuts 2 are tightened, the battery B can stably be held in place.

Although battery holding structure of the embodiment fastens the battery B together with the battery tray 5 to the floor panel 30, the battery B may be directly mounted on the floor panel 30 and the battery tray 5 may be omitted.

When the battery holding structure is used for holding a large battery having a large capacity, the battery holding structure may include a plurality of clamping plates instead of the single clamping plate 7. The clamping plate 7 may be placed at any suitable position on the battery B instead of the middle part of the battery B.

A C-shaped snap ring may be used as a hook rod holding means instead of the O ring. The C-shaped snap ring may be fitted in an annular groove formed in a proper part of the hook rod. A helical spring, a short sponge tube or a high-viscosity grease may be used as a hook rod holding means instead of the O ring.

Although the battery holding structure of the present invention has been described as applied to holding the battery on the floor panel under the driver's seat of the working vehicle, the same may be applied to holding a battery in the engine room of a vehicle, under the rear cargo body of a vehicle other than the working vehicle, such as a truck, or under the driver's seat of a forklift truck.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A battery holding structure for holding a battery at a predetermined position on a vehicle, comprising:

a floor panel of a vehicle having a battery support part for supporting a battery on the floor panel, the floor panel provided with mounting, holes penetrating the battery support part;

a clamping member provided with holes in its opposite end parts and placed on top of the battery;

hook rods each having a substantially J- or L-shaped lower part and a threaded upper part, inserted from a below side of the battery support part passed from below the battery support part upward through the mounting holes of the battery support part such that the lower parts are engaged with a below side of edges of the mounting holes of the battery support part and the threaded upper parts project upward through the holes of the battery clamping member;

nuts screwed on the threaded upper parts of the hook rods to hold the battery on the battery support part;

tubular spacers having an outside diameter greater than diameters of the mounting holes and a length defining distance between the clamping member and the battery support part, and being put on the hook rods, respectively; and hook rod holding means placed inside the tubular spacers to hold the hooked rods in the tubular spacers, respectively, wherein the battery is held between the clamping member and the battery support part through the tubular spacer by the hook rod and the nut, and the battery support part on which the battery is supported is a part of the floor panel of the vehicle.

2. The battery holding structure according to claim 1, wherein the hook rod holding means are O rings.

3. The battery holding structure according to claim 1, wherein, the number of the mounting holes is at least two, the battery is placed in a battery tray placed on the battery support part, the battery tray has lugs provided with holes having a diameter greater than that of the hook rods and smaller than the outside diameter of the tubular spacers at positions corresponding to the mounting holes, and the lugs of the battery tray are fastened together with the battery to the battery support part of the floor panel through the tubular spacers by the hook rods.

4. The battery holding structure according to claim 3, further comprising:

a first elastic pad placed between the clamping member and an upper surface of the battery, and a second elastic pad placed between a lower surface of the battery and the battery tray, wherein the battery is held between the first elastic pad and the second elastic pad.

\* \* \* \* \*